United States Patent
Hikasa

(10) Patent No.: US 12,504,918 B2
(45) Date of Patent: Dec. 23, 2025

(54) STORAGE SYSTEM AND CONTROL METHOD FOR STORAGE SYSTEM

(71) Applicant: Hitachi, Ltd., Tokyo (JP)

(72) Inventor: Soki Hikasa, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 34 days.

(21) Appl. No.: 18/606,402

(22) Filed: Mar. 15, 2024

(65) Prior Publication Data

US 2025/0085886 A1    Mar. 13, 2025

(30) Foreign Application Priority Data

Sep. 11, 2023   (JP) .................................. 2023-146984

(51) Int. Cl.
*G06F 3/06* (2006.01)

(52) U.S. Cl.
CPC ............ *G06F 3/0655* (2013.01); *G06F 3/061* (2013.01); *G06F 3/0679* (2013.01)

(58) Field of Classification Search
CPC ...... G06F 3/061; G06F 3/0625; G06F 3/0634; G06F 3/0655; G06F 3/0679; G06F 3/0688; G06F 3/0689
See application file for complete search history.

(56) References Cited

U.S. PATENT DOCUMENTS

2009/0319811 A1*  12/2009  Kawakami ............ G06F 3/0634
                                                    711/E12.001

FOREIGN PATENT DOCUMENTS

WO       2018/193608 A1    10/2018

* cited by examiner

*Primary Examiner* — Yong J Choe
(74) *Attorney, Agent, or Firm* — Volpe Koenig

(57) ABSTRACT

A storage system includes a controller, and a plurality of storage drives. The storage drives make up one or more parity groups. The controller monitors occurrence of one or more given events of an internal process different from an I/O process on host data, the given events increasing a load of a first parity group, and in response to occurrence of the given event, determines a power value indicating power to be interchanged to the first parity group, from one or more types of resources different from the first parity group in the storage system.

9 Claims, 13 Drawing Sheets

FIG. 4

| PG | PG STATE | PERFORMANCE VALUE (IOPS) | PG STATE SHIFT FLAG | FLOW [1] POWER SHARING FLAG | FLOW [2] POWER SHARING FLAG | FLOW [3] POWER SHARING FLAG |
|---|---|---|---|---|---|---|
| 1-1 | MAINTENANCE OPERATION IN PROGRESS (CC) | 100KIOPS | ON | ON | ON | OFF |
| 1-2 | NORMAL | 140KIOPS | OFF | OFF | OFF | OFF |
| 1-3 | NORMAL | 120KIOPS | OFF | OFF | OFF | OFF |
| 1-4 | NORMAL | 107KIOPS | OFF | OFF | OFF | OFF |
| ... | ... | ... | ... | ... | ... | ... |

411 412 413 414 415 416 417

401

PG STATE MANAGEMENT TABLE

IN-PG DRIVE MANAGEMENT TABLE

| PG | LDEV NUMBER | LOC-NO | (CURRENT) POWER VALUE | (MAXIMUM) POWER VALUE | DRIVE BOX NUMBER |
|---|---|---|---|---|---|
| 1-1 | 00:00:00 | SD000-00 | 9W | 25W | 1 |
| 1-1 | 00:00:00 | SD000-01 | 9W | 25W | 1 |
| 1-1 | 00:00:00 | SD000-02 | 9W | 25W | 1 |
| 1-1 | 00:00:00 | SD000-03 | 9W | 25W | 1 |
| ... | ... | ... | ... | ... | ... |

| DRIVE BOX NUMBER | NUMBER OF IN-SYSTEM DRIVES | SHARABLE POWER VALUE | CURRENTLY SHARED POWER VALUE |
|---|---|---|---|
| 1 | 24 | 0W | 0W |
| 2 | 8 | 200W | 200W |
| 3 | 4 | 600W | 0W |
| 4 | 16 | 200W | 0W |

FLOW [1] POWER SHARING MANAGEMENT TABLE

FIG. 7

| LOC-NO | (CURRENT) POWER VALUE | SHARABLE POWER VALUE | CURRENTLY SHARED POWER VALUE | IN-SYSTEM MODE |
|---|---|---|---|---|
| SD000-00 | 9W | 0W | 0W | DATA |
| SD000-01 | 9W | 0W | 0W | DATA |
| SD000-02 | 9W | 0W | 0W | DATA |
| SD001-00 | 0W | 0W | 9W | SPARE |
| ... | ... | ... | ... | ... |

FLOW [2] POWER SHARING MANAGEMENT TABLE

FIG. 8

| CPU NUMBER | MP OPERATION RATE (AVERAGE OF ALL MP OPERATION RATES) | CPU FREQUENCY | NUMBER OF PGS | (CURRENT) CPU POWER VALUE | SHARABLE POWER VALUE | CURRENTLY SHARED POWER VALUE |
|---|---|---|---|---|---|---|
| 1 | 30% | 2.3GHZ | 12 | 250W | 50W | 0W |
| 2 | 40% | 2.1GHZ | 12 | 240W | 40W | 10W |
| 3 | 50% | 1.8GHZ | 12 | 200W | 0W | 50W |
| ... | ... | ... | ... | ... | ... | ... |

FLOW [3] POWER SHARING MANAGEMENT TABLE

120 US 12,504,918 B2

STORAGE SYSTEM AND CONTROL METHOD FOR STORAGE SYSTEM

CLAIM OF PRIORITY

The present application claims priority from Japanese patent application JP 2023-146984 filed on Sep. 11, 2023, the content of which is hereby incorporated by reference into this application.

BACKGROUND OF INVENTION

1. Field of the Invention

The present invention relates to a storage system.

Description of the Related Art

WO 2018/193608 A (Patent Literature 1) is known as a conventional technique related to the present invention. WO 2018/193608 A discloses a technique described as follows: "A storage system comprises a storage device including a plurality of nonvolatile semiconductor drives; and a controller including a processor and a memory, the controller controlling the storage device. The processor measures a write load of each of the nonvolatile semiconductor drives, and when detecting a nonvolatile semiconductor drive with the write load exceeding a given threshold, selects the nonvolatile semiconductor drive as a power consumption restriction relaxation target, and selects a nonvolatile semiconductor drive that can tolerate a reduction in power consumption, the nonvolatile semiconductor drive being among nonvolatile semiconductor drives other than the power consumption restriction relaxation target, as a power consumption restriction enhancement target. After reducing power consumption by the nonvolatile semiconductor drive as the power consumption restriction enhancement target, the processor increases power consumption by the nonvolatile semiconductor drive as the power consumption restriction relaxation target.".

SUMMARY OF THE INVENTION

Processes executed by a storage system include processing of an I/O request from a host and an internal process that may affect I/O performance for the host as well. An explosive increase in data volume in recent years has led to demand for a storage system with higher performance and faster processing, and at the same time, has created demand for reduction in power consumption. Reducing power consumption, however, affects I/O performance. Hence a technique that effectively reduces power consumption by a storage system while suppressing a drop in the overall performance of the storage system is now in demand.

One aspect of the present invention provides a storage system including: a controller; and a plurality of storage drives. The storage drives make up one or more parity groups, and the controller monitors occurrence of one or more given events of an internal process different from an I/O process on host data, the given events increasing a load of a first parity group, and in response to occurrence of the given event, determines a power value indicating power to be interchanged to the first parity group, from one or more types of resources different from the first parity group in the storage system.

According to the one aspect of the present invention, reduction in power consumption by the storage system and improvement in the overall performance of the storage system are both achieved.

BRIEF DESCRIPTION OF THE DRAWINGS

FIG. 4 depicts a configuration example of a PG state management table;

FIG. 5 depicts a configuration example of an in-PG drive management table;

FIG. 6 depicts a configuration example of a flow [1] power interchanging management table;

FIG. 7 depicts a configuration example of a flow [2] power interchanging management table;

FIG. 8 depicts a configuration example of a flow [3] power interchanging management table;

DESCRIPTION OF THE PREFERRED EMBODIMENTS

Figure 1:
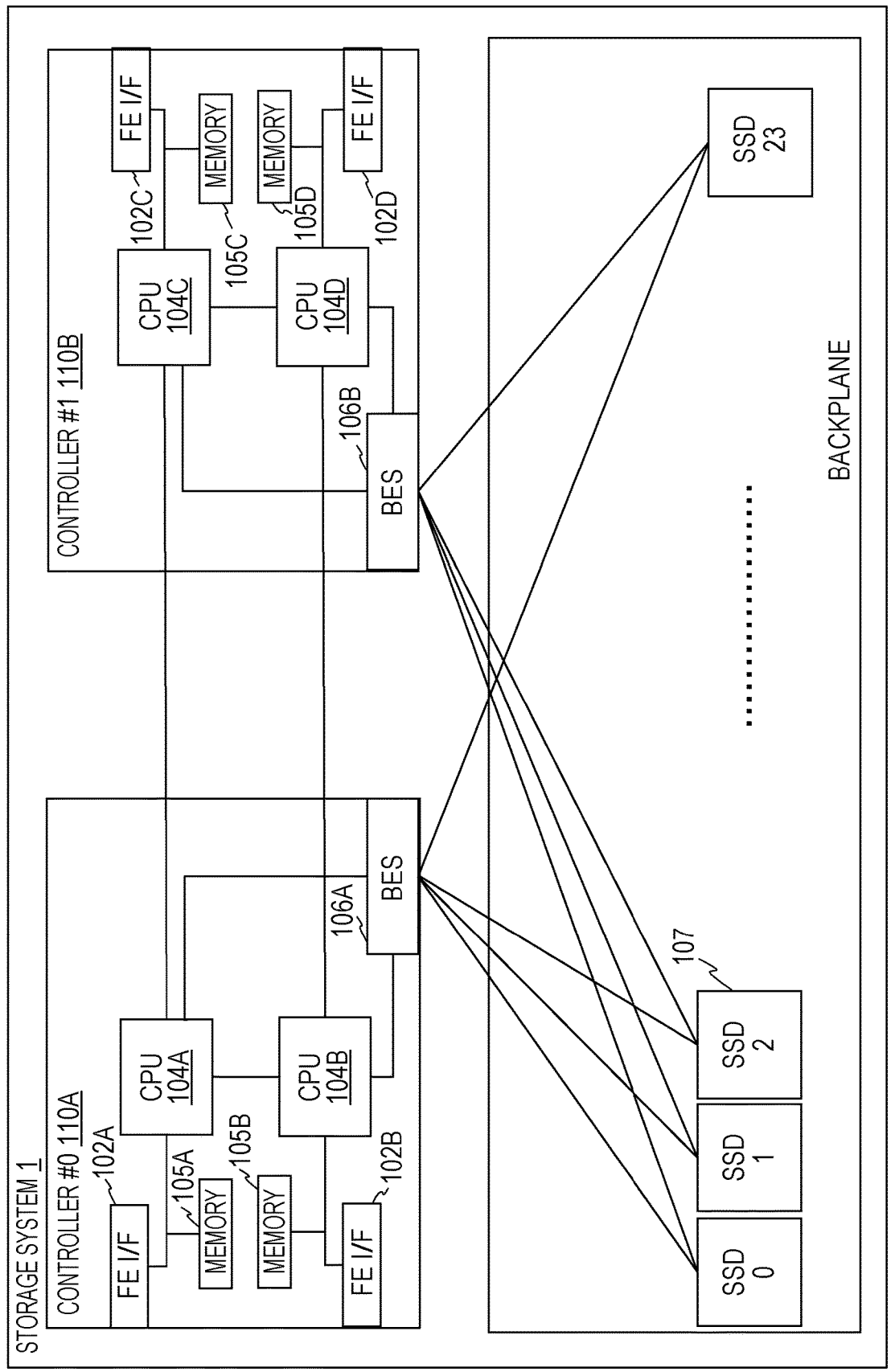
FIG. 1 depicts a configuration example of a storage system according to an embodiment of the present description.

Embodiments of the present invention will hereinafter be described with reference to the drawings. In the following description, pieces of information are expressed as "management tables" and the like in some cases. These pieces of information, however, may be expressed as data structures different from such tables. To indicate non-dependency on a specific data structure, "management table" may be referred to as "management information".

A program is executed by one or more processors, e.g., one or more central processing units (CPUs), and performs predetermined processing. Because such a program is executed by using a storage resource (e.g., a memory) and a communication interface (e.g., a communication port) on a necessary basis, the subject of the processing may be defined as the processor. The processor may have dedicated hardware, in addition to the CPU. A computer program may be acquired from a program source and installed in each computer. The program source may be provided by, for example, a program distribution server or a recording medium.

Each element can be identified by a number or the like, but may be identified by a different type of identification information, such as a name, if such identification information is effective in identifying the element. In the drawings and description of the present invention, the same parts are denoted by the same reference signs. The present invention is not limited to the embodiments described herein, and all application examples conforming to the idea of the present invention are included in the technical scope of the present invention. Unless otherwise specified, each constituent element may take a single form and a plural form as well.

In the embodiments of the present description, power consumed by a storage drive is controlled in response to a given event having occurred in the storage drive. This reduces power consumption by a storage system and at the same time, suppresses a drop in the performance and/or reliability of the storage system.

For example, when a failure of a drive occurs in the storage system, data held by the failure-developing drive is evacuated or recovered in a party group including the failure-developing drive. This protects the data held by the failure-developing drive. However, if another drive failure occurs in the same parity group during this evacuation/recovery process, data recovery becomes impossible, in which case customer data may be lost.

In-storage drives ensures their redundancy configuration by making up a parity group. In this case, when drive blockage occurs, a process of calculating parity from drives belonging to the parity group and calculating data of a blocked drive occurs (collection copy). At execution of collection copy, a drive operation rate increases to twice as high as a normal operation rate, which creates a high load state. When an I/O request from a host is received in such a state, giving priority to processing of the host I/O request results in a longer collection copy process, which may lead to a drop in system reliability.

In addition to the above-mentioned storage drive maintenance operation, there are other processes by which an additional load different from host I/O is generated in a storage drive. Such processes include, for example, an internal process on storage drives, such as formatting a storage drive following generation of a new volume from the parity group and executing garbage collection in a write-once storage drive.

According to the embodiments of the present description, overall power consumption by the storage system is reduced by controlling power consumption by constituent elements of the storage system. Power consumption by a storage drive is associated with its performance. In other words, an increase in power consumption means an increase in performance. In one embodiment of the present description, the above-described event of internal processing that increases a load of a storage drive, the event being different from host I/O as a load-applying element, is monitored and, in response to occurrence of the event, increased power consumption by the storage drive is compensated by interchanged surplus power from other resources. Examples of power interchanging resources include a processor of a controller, a drive box, and a spare storage drive. Thus, improvement in the performance/reliability of the storage system and reduction in power consumption are both achieved.

First Embodiment

FIG. 1 depicts a configuration example of a storage system according to an embodiment of the present description. A storage system 1 includes a backplane composed of 2 controllers 110A and 110B and 24 storage drives (which are referred to also as storage devices) 107. The backplane is a drive box integrated with the controllers. In FIG. 1, one storage drive is denoted by reference sign "107", as an example.

The controller 110A includes two front-end interfaces (FE I/F) 102A and 102B, two processors (CPU) 104A and 104B, two memories 105A and 105B, and one back-end switch (BES) 106A. The processor 104A is connected to the memory 105A, to the front-end interface 102A, and to the back-end switch 106A. The processor 104B is connected to the memory 105B, to the front-end interface 102B, and to the back-end switch 106A. The processors 104A and 104B are interconnected. The back-end switch 106A is a connection unit connected to the storage drives 107.

Similarly, the controller 110B includes two front-end interfaces 102C and 102D, two processors 104C and 104D, two memories 105C and 105D, and one back-end switch 106B. The processor 104C is connected to the memory 105C, to the front-end interface 102C, and to the back-end switch 106B. The processor 104D is connected to the memory 105D, to the front-end interface 102D, and to the back-end switch 106B. The processors 104C and 104D are interconnected. The back-end switch 106B is a connection unit connected to the storage drives 107.

The two controllers 110A and 110B are interconnected by an inter-controller path. In FIG. 1, the processors 104A and 104C are interconnected, and the processors 104B and 104D are interconnected. The processor 104A may be connected also to the processor 104D, and the processor 104B may be connected also to the processor 104C.

Each of the front-end interfaces 102A to 102D is connected to a host device (not illustrated), and performs protocol control in communication with the host device, thus extracting a data input/output request from the host device or sending a response to the data input/output request, back to the host device.

In the storage system 1, an example of a protocol for communication with the host device is Fibre Channel. Another example is internet small computer system interface (iSCSI). Still another example is Non-Volatile Memory express over FABric (NVMe over FABric).

The front-end interface 102A sends a data input/output request received from the host device, to the processor 104A, and sends a response to the data input/output request, the response being sent from the processor 104A to the front-end interface 102A, back to the host device. The front-end interface 102B sends a data input/output request received from the host device, to the processor 104B, and sends a response to the data input/output request, the response being sent from the processor 104B to the front-end interface 102B, back to the host device.

The front-end interface 102C sends a data input/output request received from the host device, to the processor 104C, and sends a response to the data input/output request, the response being sent from the processor 104C to the front-end interface 102C, back to the host device. The front-end interface 102D sends a data input/output request received from the host device, to the processor 104D, and sends a response to the data input/output request, the response being sent from the processor 104D to the front-end interface 102D, back to the host device. The number of front-end interfaces varies depending on system design.

The processors 104A to 104D carry out their respective interchanged portions of a process on data input/output requests from host devices in the storage system 1. FIG. 1 shows a set of two processors 104A and 104B and a set of two processors 104C and 104D that are included respectively in two controllers 110A and 110B. The number of processors in each controller, however, is not limited to two and may be any number equal to or larger than two.

The memories 105A to 105D store program codes executed by the processors 104A to 104D and data processed by the processors 104A to 104D, respectively. The memories 105A to 105D, in particular, temporary store data written thereto by a host device until the data is written to any one of the storage drives 107.

The memories 105A to 105D temporarily store data read out of one of the storage drives 107 until the data is sent back to the host device. These memories 105A to 105D are, typically, volatile memories, such as dynamic random access memories (DRAMs). The number of memories per processor is not limited to one, and may be any number equal to or larger than one.

The back-end switches 106A and 106B connect the processors 104A to 104D to the storage drives 107. The back-end switches 106A and 106B make connection to the storage drives 107 in conformity to a storage protocol that the storage drives 107 use for data input/output.

A typical example of the storage protocol the storage drives 107 use is non-volatile memory express (NVMe). Another example is Serial Attached Small computer system interface (SAS). The number of back-end switches is any given number. The back-end switches may not be provided, in which case the processors are directly connected to the storage drives.

The storage drive 107 reads or writes data in response to a data input/output request sent from one of the processors 104A to 104D via the back-end switch 106A or 106B. A typical example of the storage drive 107 is a solid state drive (SSD) using a flash memory as a storage element. The following description, therefore, will be made on the assumption that the storage drive is an SSD. It should be noted, however, that a hard disk drive (HDD) using a magnetic disk as a storage element may also be used as the storage drive 107. The storage drive 107 may be one type of storage drive or may be a combination of multiple types of storage drives. The number of storage drives is any given number.

Figure 2:
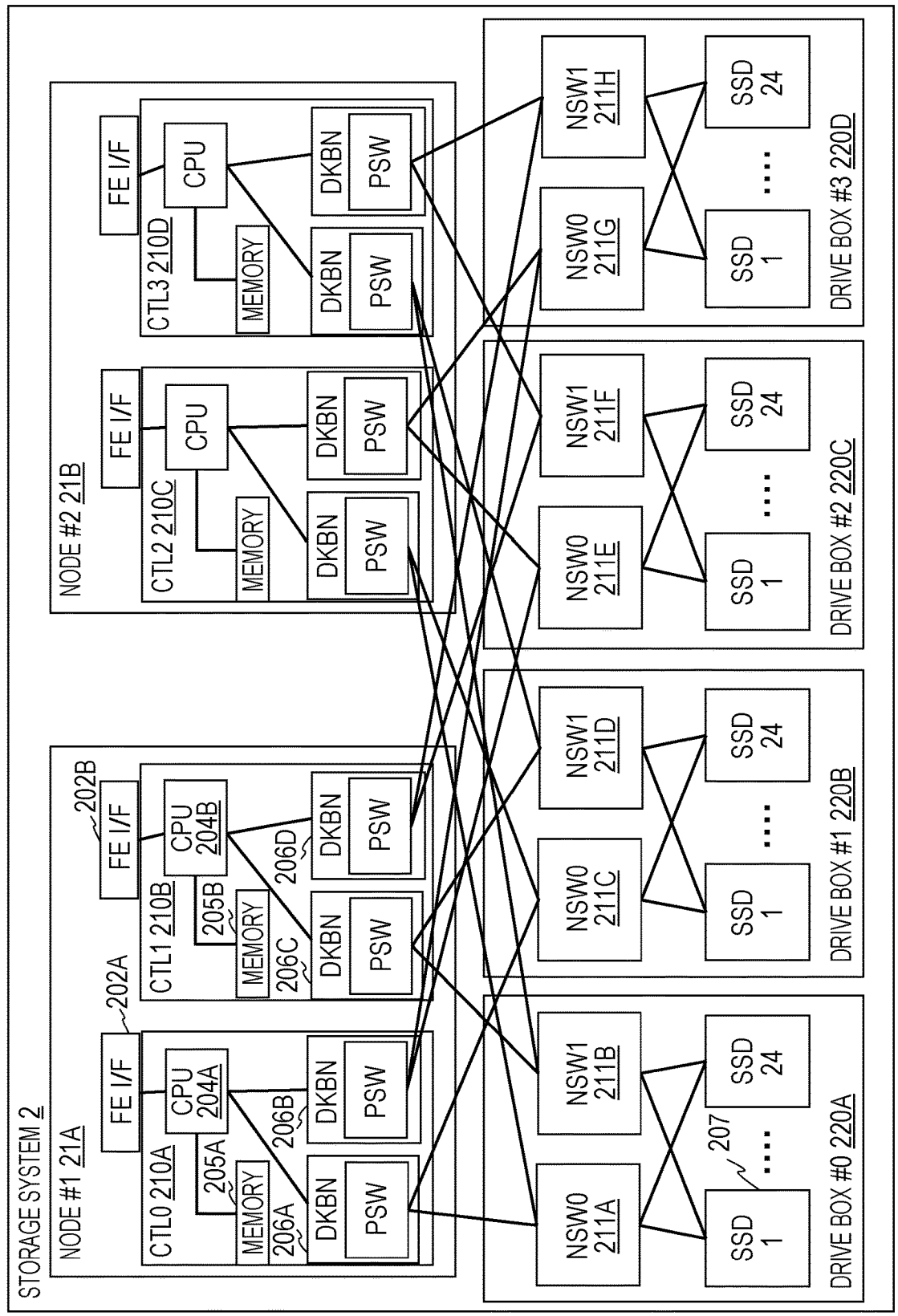
FIG. 2 depicts a configuration example of a storage system according to the embodiment of the present description.

FIG. 2 depicts a configuration example of a storage system according to the embodiment of the present description. It should be noted that description of constituent elements shown in FIG. 1 can apply to description of constituent elements of FIG. 2 that are identical in name with the constituent elements shown in FIG. 1. A storage system 2 includes two nodes 21A and 21B, and four drive boxes 220A to 220D. The nodes 21A and 21B each include two controllers (CTL). The node 21A includes controllers 210A and 210B. The node 21B includes controllers 210C and 210D.

The controller 210A includes a front-end interface 202A, a processor (CPU) 204A, a memory 205A, and two disk boards for NVMe (DKBN) 206A and 206B. The DKBNs 206A and 206B are modules having ports connecting the controller 210A to the drive boxes. Each of the DKBNs 206A and 206B includes a P-path switch (PSW), which is a PCIe switch. The processor 204A is connected to other constituent elements described above.

The controller 210B includes a front-end interface 202B, a processor (CPU) 204B, a memory 205B, and two disk boards for NVMe (DKBN) 206C and 206D. The DKBNs 206C and 206D are modules having ports connecting the controller 210B to the drive boxes. Each of the DKBNs 206C and 206D includes a P-path switch (PSW), which is a PCIe switch. The processor 204B is connected to other constituent elements described above.

The controllers 210C and 210D of the node 21B are each identical in configuration with the controller 210A or 210B. Description of the controllers 210C and 210D is therefore omitted. The number of each group of constituent elements in the storage system varies depends on system design.

The drive boxes 220A to 220D each include a plurality of storage drives (storage drive group) and further include a cooling fan and a power supply. The drive boxes 220A to 220D are run by separate power supplies, respectively.

In the configuration example of FIG. 2, the drive boxes 220A to 220D each house 24 storage drives 207. The number of storage drives included in each drive box may be different one another or the same, and varies depends on system design. In FIG. 2, one storage drive is denoted by reference sign "207", as an example. The drive boxes 220A to 220D each further include two NVMe switches (NSW). These switches are Drive expander PCIe switches.

Specifically, the drive box 220A includes NSWs 211A and 211B, the drive box 220B includes NSWs 211C and 211D, the drive box 220C includes NSWs 211E and 211F, and the drive box 220D includes NSWs 211G and 211H. Each NSW is connected to all storage drives 207 in the drive box.

The DKBN 206A of the controller 210A is connected to the NSW 211A of the drive box 220A and to the NSW 211C of the drive box 220B. The DKBN 206B is connected to the NSW 211E of the drive box 220C and to the NSW 211G of the drive box 220D. In other words, the controller 210A is connected to all drive boxes 220A to 210D.

Similarly, the DKBN 206C of the controller 210B is connected to the NSW 211B of the drive box 220A and to the NSW 211D of the drive box 220B. The DKBN 206D is connected to the NSW 211G of the drive box 220C and to the NSW 211H of the drive box 220D. The controller 210B is thus connected to all drive boxes 220A to 220D.

The controllers 210C and 210D of the node 21B are also connected to all drive boxes 220A to 220D via DKBNs and PSWs, respectively. Each DKBN is connected to NSWs of two different drive boxes.

Hereinafter, description will be made using reference signs of constituent elements of the storage system shown in FIG. 2. A number left by removing an alphabetical letter at the tail of a reference sign denotes a single constituent element or a plurality of constituent elements of the same type. For example, the processor 204 denotes some or all of the processors 204A to 204D. The following description of the drive box can apply also to description of the backplane (storage drive group) in the configuration example of FIG. 1.

Figure 3:
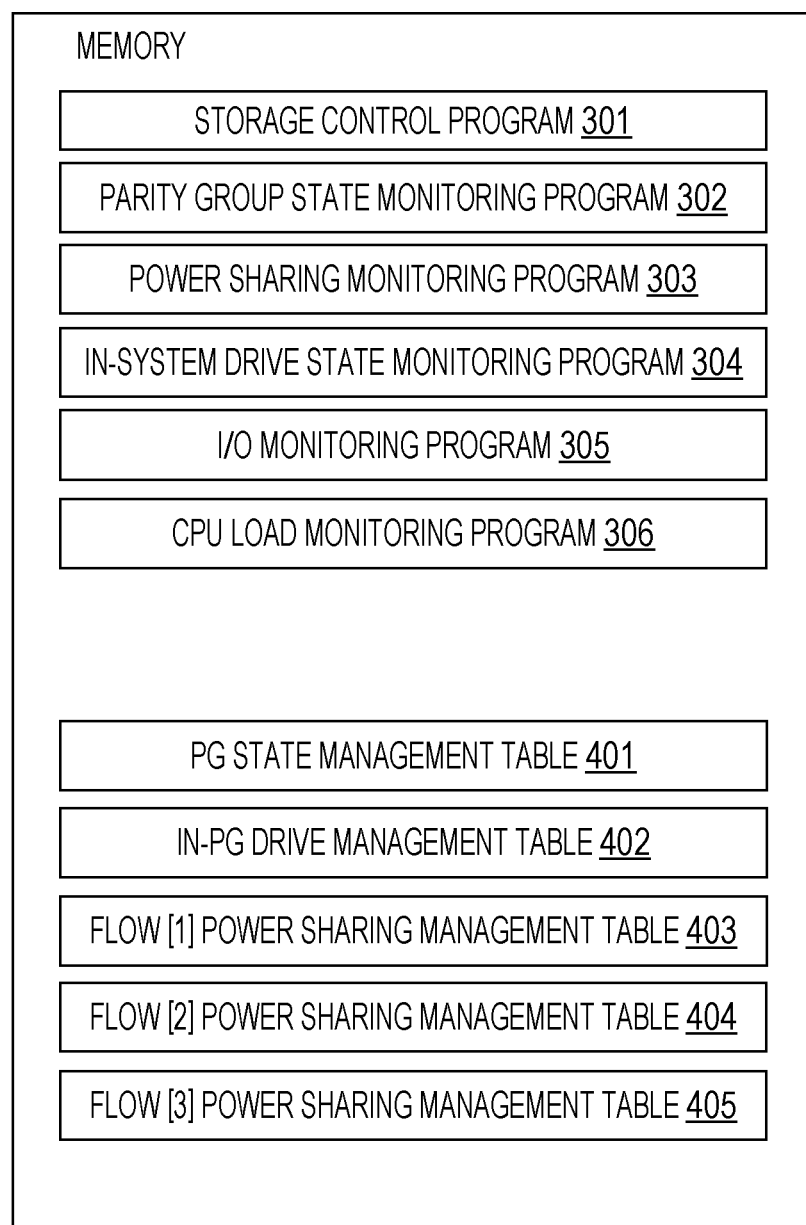
FIG. 3 depicts an example of information stored in a memory of each controller.

FIG. 3 depicts an example of information stored in the memory 205 of each controller 210. The memory 205 stores management information including a plurality of programs and tables. Specifically, the memory 205 stores a storage control program 301, a parity group state monitoring program 302, a power interchanging monitoring program 303, an in-system drive state management program 304, an I/O monitor program (performance value monitoring program) 305, and a CPU load monitoring program 306.

The processor 204 of the controller 210 executes a process according to a program stored in the memory 205 of the controller 210, thereby operating as a given functional unit. For example, according to the above program, the processor 204 can function as a storage control unit, a parity group state monitoring unit, a power interchanging monitoring unit, an in-system drive state management unit, an I/O monitoring unit, or a CPU load monitoring unit.

The management information stored in the memory 205 includes a PG state management table 401, an in-PG drive management table 402, a flow [1] power interchanging management table 403, a flow [2] power interchanging management table 404, and a flow [3] power interchanging management table 405.

FIG. 4 depicts a configuration example of the PG state management table 401. The PG state management table 401 manages parity groups (PG) in the storage system 2. A parity group is referred to also as a RAID (redundant array of independent discs) group. The parity group is made up of a plurality of storage drives 207.

The controller 210 configures a volume for data managing by using a storage area of one parity group. The parity group stores, for example, host data received from a host device, plus redundant data generated from the host data. The host data and redundant data are stored distributively in storage drives of the parity group. As a result, even if any given storage drive 207 storing the host data fails, the host data can be recovered.

In FIG. 4, the PG state management table 401 includes a PG field 411, a PG state field 412, a performance value field 413, a PG state shift flag field 414, a flow [1] power interchanging flag field 415, a flow [2] power interchanging flag field 416, and a flow [3] power interchanging flag field 417.

The PG field 411 indicates an identifier (ID) for a parity group. The PG state field 412 indicates the state of a parity group. The normal state of the parity group shifts to a different state as a result of occurrence of a given event. As it will be described later, besides the normal state, the state of the parity group includes a maintenance operation to deal with a failure of a storage drive, generation of a volume from the parity group, and garbage collection in the parity group.

The performance value field 413 indicates the performance of a parity group, and is updated by the I/O monitor program 305. In this example, the performance is expressed in terms of IOPS. In another case, the performance may be expressed in terms of throughput. The PG state shift flag field 414 is set to ON when the state of the parity group shifts from the normal state to a different given state. As it will be described later, the PG state shift flag is set to ON in a maintenance operation state, a format state, or a garbage collection state The flow [1] power interchanging flag field 415 indicates whether power is interchanged from a flow [1]. The flow [2] power interchanging flag field 416 indicates whether power is interchanged from a flow [2]. The flow [3] power interchanging flag field 417 indicates whether power is interchanged from a flow [3].

As it will be described later, the flows [1], [2], and [3] are flows for power interchanging, meaning process flows for resources that can interchange power with the storage drives 207. As it will be described later, a power interchanging source of the flow [1] is a drive box. A power interchanging source of the flow [2] is a storage drive. A power interchanging source of the flow [3] is a processor (CPU).

FIG. 5 depicts a configuration example of the in-PG drive management table 402. The in-PG drive management table 402 manages information on the storage drives 207 included in each parity group. The in-PG drive management table 402 is updated and managed by the in-system drive state management program 304.

In the configuration example shown in FIG. 5, the in-PG drive management table 402 includes a PG field 421, an LDEV number field 422, an LOC-NO field 423, a (current) power value field 424, a (maximum) power value field 425, and a drive box number field 426. Each record indicates information on one storage drive 207.

The PG field 421 indicates an identifier for a parity group. The LDEV number field 422 indicates a number (identifier) for an LDEV. The LOC-NO field 423 indicates a number (identifier) for a location (slot) where the storage drive 207 is placed in the drive box. The (current) power value field 424 indicates a power consumption value currently set for the storage drive 207. The (maximum) power value field 425 indicates a maximum power consumption value that can be set for the storage drive 207. The drive box number field 426 indicates a number (identifier) for the drive box in which the storage drive 207 is housed.

Multiple levels of power consumption, e.g., four or five levels of power consumption can be set for the storage drive 207. An increase in power consumption means an improvement in the performance of the storage drive 207. When a processing load of the storage drive 207 is high, therefore, a high power consumption level is set. This reduces a processing delay. For example, the performance of the SSD can be improved by increasing simultaneous access to its memory chip. Increasing the number of simultaneous accesses increases power consumption.

FIG. 6 depicts a configuration example of the flow [1] power interchanging management table 403. The flow [1] power interchanging management table 403 manages information on a power interchanging source of the flow [1]. The power interchanging source of the flow [1] is a drive box. Each record carries information on power of the drive box that can serve as a power interchanging source. In the configuration example of FIG. 6, the flow [1] power interchanging management table 403 includes a drive box number field 431, a number-of-in-system-drives field 432, an interchangeable power value field 433, and a currently interchanged power value field 434.

The drive box number field 431 indicates a number (identifier) for a drive box. The number-of-in-system-drives field 432 indicates the number of storage drives currently included in the drive box. The interchangeable power value field 433 indicates a power value representing power the drive box is currently able to interchange. A maximum interchangeable power value of the drive box is determined according to the number of empty slots the drive box has. The number of empty slots is given by subtracting the current number of drives of the drive box from the maximum number of drives of the drive box. From this number of empty slots and a preset function, the maximum interchangeable power value is determined. The currently interchanged power value field 434 indicates a power value representing power the drive box is currently interchanging. A value in the interchangeable power value field 433 is calculated, based on the maximum interchangeable power value and on a value in the currently interchanged power value field 434. For example, the value in the interchangeable power value field 433 is given by subtracting the value in the currently interchanged power value field 434 from the maximum interchangeable power value.

FIG. 7 depicts a configuration example of the flow [2] power interchanging management table 404. The flow [2] power interchanging management table 404 manages information on a power interchanging source of the flow [2]. The power interchanging source of the flow [2] is a storage drive. Each record carries information on power of the storage drive that can serve as a power interchanging source. In the configuration example of FIG. 7, the flow [2] power interchanging management table 404 includes an LOC-NO field 441, a (current) power value field 442, an interchangeable power value field 443, a currently interchanged power value field 444, and an in-system mode field 445.

The LOC-NO field 441 indicates a number (identifier) for a location (slot) where the storage drive 207 is placed in the drive box. The number (identifier) indicated in this field serves also as an identifier for the storage drive incorporated in the system. The (current) power value field 442 indicates current power consumption by the storage drive. The interchangeable power value field 443 indicates a power value representing power the storage drive is currently able to interchange. The currently interchanged power value field 444 indicates a power value representing power the storage drive is currently interchanging.

The in-system mode field 445 indicates a mode of the storage drive 207. In this example, modes of the storage drive 207 are defined as: a DATA mode, in which the storage drive performs I/O processing in a parity group, a SPARE mode, in which the storage drive is prepared as a SPARE drive, and a FREE mode. In the FREE mode, the storage drive, of which use is undetermined, is left free as a backup. A value in the in-system mode field 445 is managed by the in-system drive state management program 304.

The maximum interchangeable power value of each storage drive is set in advance for each in-system mode of the storage drive. The maximum interchangeable power value to be set varies depending on system design. For example, the maximum interchangeable power value in the DATA mode is 0, and the same in the SPARE mode or FREE mode is 9 W. A value in the interchangeable power value field 443 is calculated, based on the maximum interchangeable power value and on a value in the (current) power value field 442 and/or a value in the currently interchanged power value field 444. For example, an interchangeable power value in the SPARE mode or FREE mode may match a value in the (current) power value field 442.

FIG. 8 depicts a configuration example of the flow [3] power interchanging management table 405. The flow [3] power interchanging management table 405 manages information on a power interchanging source of the flow [3]. The power interchanging source of the flow [3] is a processor (CPU). Each record carries information on power of the processor that can serve as a power interchanging source.

In the configuration example of FIG. 8, the flow [3] power interchanging management table 405 includes a CPU number field 451, an MP operation rate field 452, a CPU frequency field 453, a number-of-PGs field 454, a (current) CPU power value field 455, an interchangeable power value field 456, and a currently interchanged power value field 457.

The CPU number field 451 indicates a number (identifier) for a CPU. The MP operation rate field 452 indicates an operation rate of a plurality of MPs (microprocessors) included in the CPU. In this field, an average operation rate of all MPs is adopted. The CPU frequency field 453 indicates an operating frequency of the CPU. The number-of-PGs field 454 indicates the number of parity groups accessed by the CPU for data writing and reading. Values in the MP operation rate field 452, the CPU frequency field 453, and the number-of-PGs field 454 are managed by the CPU load monitoring program 306.

The (current) CPU power value field 455 indicates a power value representing current power consumption by the CPU. The interchangeable power value field 456 indicates a power value representing power the CPU is currently able to interchange. The currently interchanged power value field 457 indicates a power value representing power the CPU is currently interchanging. A maximum interchangeable power value can be calculated from, for example, an MP operation rate value and a CPU frequency value of the CPU.

For example, a difference between a current MP operation rate and a preset upper limit value (e.g., 50%) is calculated. A lowest CPU frequency that can be set is then calculated in accordance with a relationship with the above difference and a current CPU frequency. The relationship between the lowest CPU frequency that can be set and the difference and current CPU frequency is determined in advance. In addition, a relationship between the CPU frequency and CPU power consumption is determined in advance as well. A difference between power consumption at the highest CPU frequency and power consumption at the calculated lowest CPU frequency that can be set is the maximum interchangeable power value.

In calculation of the maximum interchangeable power of the CPU, the maximum interchangeable power may be determined based on the number of parity groups accessed by the CPU. For example, when the number of parity groups accessed by the CPU is equal to or larger than an upper limit number set in advance for the CPU, the maximum interchangeable power value may be determined to be 0. Alternatively, the lowest CPU frequency may be set according to the number of parity groups accessed by the CPU. As the number of parity groups increases, the lowest CPU frequency gests higher.

Figure 9A:
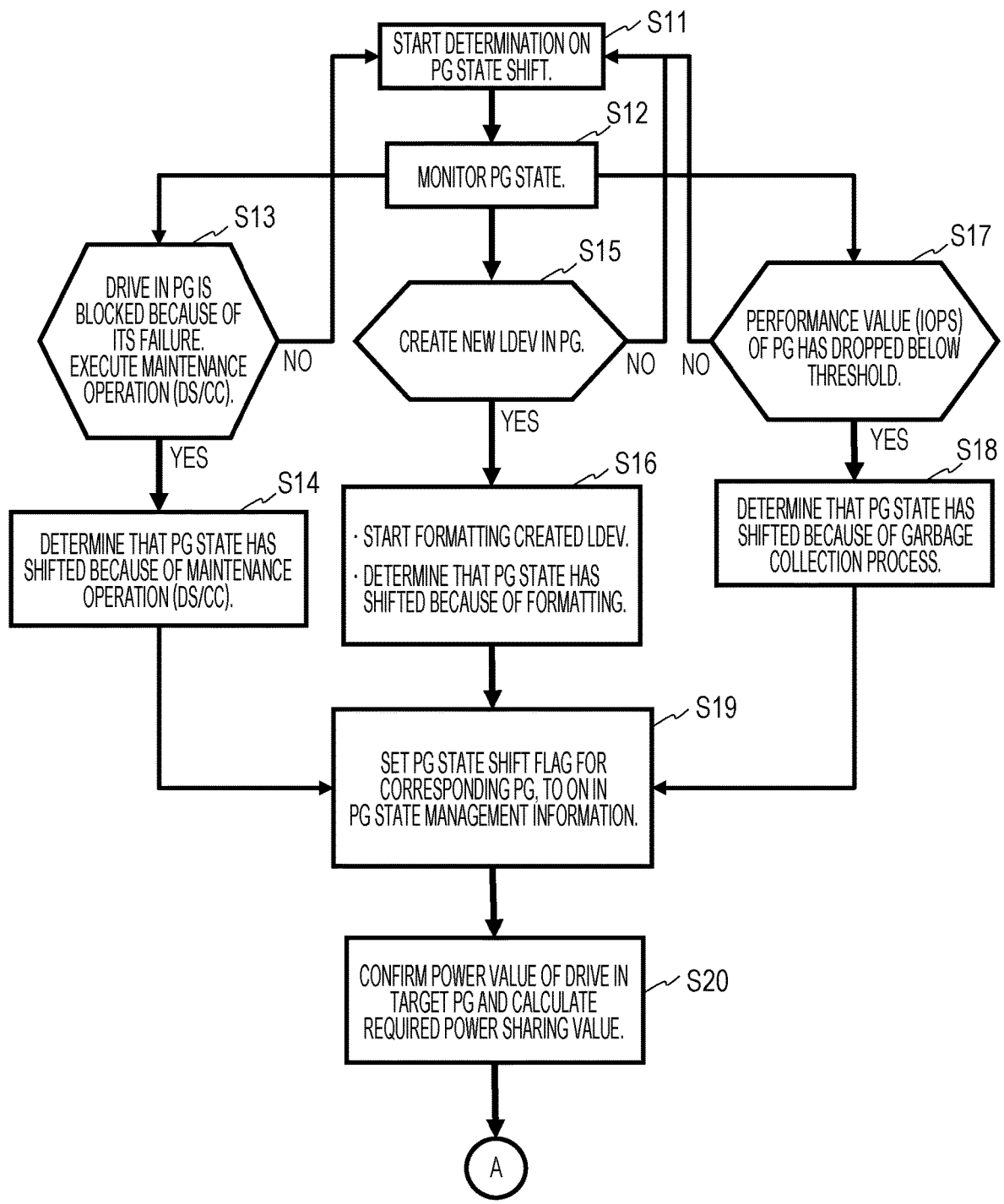
FIG. 9A depicts a flow of a power interchanging process that is executed as a result of a shift in the state of a parity group.
Figure 9B:
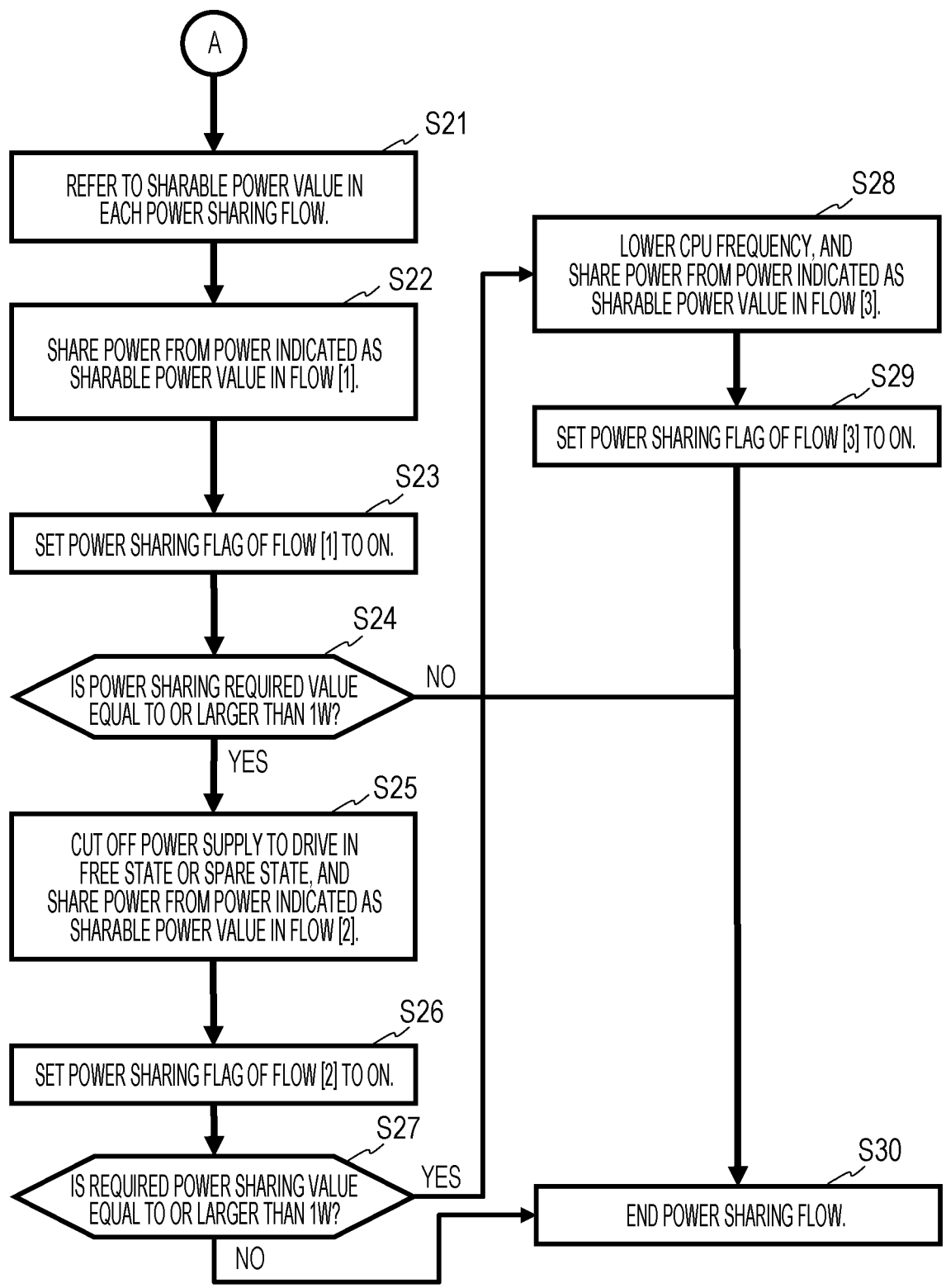
FIG. 9B depicts a flow of a power interchanging process that is executed as a result of a shift in the state of a parity group.

FIGS. 9A and 9B are flowcharts of a power interchanging process that is executed as a result of a shift in the state of a parity group In FIG. 9A, the parity group state monitoring program 302 starts determination on a shift in the state of a parity group (S11). The parity group state monitoring program 302 monitors the state of each parity group (S12).

In the state monitoring, the parity group state monitoring program 302 determines whether a storage drive 207 in any one of the parity groups is blocked because of its failure and a maintenance operation is being executed (S13). Information on the failure of the storage drive 207 is imparted from the storage drive 207 or the drive box 220.

The maintenance operation is executed when the storage drive 207 in the parity group fails. It recovers lost data. In this example, dynamic sparing (DS) or correction copy (CC) can be executed as the maintenance operation. The maintenance operation is executed by, for example, the storage control program 301.

DS is a type of maintenance operation according to which, when the storage drive 207 of the parity group detects a sign of failure, the storage drive 207 evacuates data to a Spare drive by one-to-one operation. The Spare drive is a spare storage drive to which data is evacuated in the event of a storage drive failure (or detection of a possibility of storage drive failure). CC is another type of maintenance operation according to which, when the storage drive 207 of the parity group is blocked because of its failure, data is generated from a different storage drive 207, using parity bits, and the recovered data is written to the Spare drive.

When the determination at step S13 gives a result "Y", the parity group state monitoring program 302 determines that the state of the parity group has shifted because of the maintenance operation (S14). The parity group state monitoring program 302 updates a value in the PG state field 412 to a value indicating a state of the maintenance operation being in progress.

In the state monitoring, the parity group state monitoring program 302 determines whether an LDEV is newly created in any one of the parity groups (S15). The LEDV (logical device) is a volume that is a logical storage area allocated to a physical storage area of a parity group. Generation of the LDEV is managed by management information (not illustrated). For example, the LDEV is an internal volume, and a volume accessed by a host may be generated from the LDEV.

When the determination at step S15 gives a result "Y", the storage control program 301 starts formatting the created LDEV. In LDEV formatting, a formatting process for allocating a logical storage area to a physical storage area of a parity group is executed. The formatting process is a process by which given data is written from the controller 210 to the storage drive of the parity group. The parity group state monitoring program 302 determines that the state of the parity group has shifted because of LDEV formatting (S16). The parity group state monitoring program 302 updates a value in the PG state field 412 to a value indicating a state of formatting being in progress.

In the state monitoring, the parity group state monitoring program 302 determines whether the performance value of any one of the parity groups has dropped below a preset threshold (S17). The performance value of the parity group can be acquired from the performance value field 413 of the PG state management table 401. When the determination at step S17 gives a result "Y", the parity group state monitoring program 302 determines that the state of the parity group has shifted because of a garbage collection process in the storage drive 207 (S18). A drop in the performance value of the parity group may be associated with an additional process different from a normal I/O process.

Garbage collection is executed in a storage drive that does not overwrite existing data but writes additional data, as an SSD does. For example, in the SSD, garbage collection is executed to copy valid data in a partial storage area in a block to a different block and delete data in the entire block that includes invalid data (garbage). As a result, new data can be written to the whole area of the block. Garbage collection is periodically executed. It selects an area including garbage, copies valid data to a different free area, and then sets the selected area free to render it usable.

When it is determined at step S14, S16, or S18 that a shift in the state of the parity group has occurred, the parity group state monitoring program 302 sets a value in the PG state shift flag field 414 corresponding to the parity group to, ON in the PG state management table 401 (S19).

In a maintenance operation, formatting, or garbage collection at the storage drive 207 (parity group), an additional process is added to the normal I/O process. This results in a drop in the I/O performance of the parity group. A parity state shift flag indicates a parity group of which the I/O performance drops. It should be noted that a determination may be made on some of the above events only, e.g., on IOPS only or may be made on an event different from the above events.

Subsequently, the power interchanging monitoring program 303 acquires information on a power value of each of storage drives 207 included in the parity group with a value in the PG state shift flag field 414 being ON, from the in-PG drive management table 402, and calculates a power interchanging required value (S20).

For example, the power interchanging monitoring program 303 acquires a current set power consumption value and a maximum set power consumption value of the storage drive 207, from the (current) power value field 424 and the (maximum) power value field 425, and calculates a difference between the current set power consumption value and the maximum set power consumption value. In this example, the calculated difference is determined to be a power interchanging required value for the storage drive 207. The sum of power interchanging required values for the storage drives 207 making up the parity group is a power interchanging required value for the parity group. The power interchanging required value may be calculated from a difference between a current value and a set power consumption level that is smaller than a maximum but is larger than the current value. In addition, necessary power consumption may be set for each event that creates the need of power interchanging.

Subsequently, the process flow proceeds to the next flowchart via a connection node A. FIG. 9B depicts steps to follow the connection node A. The power interchanging monitoring program 303 refers to an interchangeable power value in each power interchanging flow (S21). Specifically, the power interchanging monitoring program 303 refers to the flow [1] power interchanging management table 403, the flow [2] power interchanging management table 404, and the flow [3] power interchanging management table 405. The power interchanging flow means a process flow for a resource that can interchange power with the storage drive 207.

In this example, three power interchanging flows are prepared. As it will be described later, a power interchanging source of the flow [1] is a drive box. A power interchanging source of the flow [2] is a storage drive. A power interchanging source of the flow [3] is a processor (CPU).

The power interchanging monitoring program 303 refers to the flow [1] power interchanging management table 403, interchanges power from power indicated as an interchangeable power value (S22), and updates a value in the interchangeable power value field 433 and a value in the currently interchanged power value field 434. In addition, in the flow [1] power interchanging flag field 415 of the PG state management table 401, the power interchanging monitoring program 303 sets a flag for the corresponding parity group, to ON (S23). When an interchangeable power value is larger than a interchanging-required power value, only the power indicated as the interchanging-required power value is interchanged.

For example, the power interchanging monitoring program 303 selects the drive box 220 including the above parity group in priority, as a power interchanging source, and if power to interchange is not enough, interchanges power additionally from a different drive box 220. It should be noted that a power interchanging source drive box may be selected regardless of which drive box the parity group belongs to. For example, respective portions of interchangeable power of all drive boxes 220 may be interchanged at the same ratio with the parity group. A power interchanging source interchanging power with each parity group may be limited to some drive boxes 220 specified in advance, e.g., limited to the drive box 220 including the parity group to interchange power with.

Subsequently, the power interchanging monitoring program 303 determines whether a remaining interchanging-required power value, which is given by subtracting the power value indicating power interchanged in the flow [1] from the interchanging-required power value, is a prescribed value, which is 1 W or more in this example (S24). The prescribed value is set arbitrarily. When the remaining interchanging-required power value is less than 1 W (S24: N), the process flow comes to an end (S30).

When the remaining interchanging-required power value is 1 W or more (S24: Y), the power interchanging monitoring program 303 cuts off power supply to a storage drive in the FREE or SPARE state, interchanges power from power indicated as an interchangeable power value in the flow [2] power interchanging management table (S25), and updates a value in the interchangeable power value field 443 and a value in the currently interchanged power value field 444. In addition, in the flow [2] power interchanging flag field 416 of the PG state management table 401, the power interchanging monitoring program 303 sets a flag for the corresponding parity group, to ON (S26).

Specifically, the power interchanging monitoring program 303 refers to the flow [2] power interchanging management table 404 and selects a storage drive with a value in the in-system mode field 445 being FREE or SPARE and a value in the interchangeable power value field 443 being larger than 0 W. The power interchanging monitoring program 303 cuts off power supply to the selected storage drive and interchanges power indicated as the interchangeable power value with the parity group, i.e., the power interchanging target.

The power interchanging monitoring program 303 may select in priority a storage drive 207 in the FREE state or may select in priority a storage drive in the same drive box to which the parity group belongs to. The storage drive as the power interchanging source may be randomly selected. Selection of the storage drive as the power interchanging source continues until the sum of interchanged power values reaches the remaining interchanging-required power value or all storage drives available are selected.

Subsequently, the power interchanging monitoring program 303 determines whether a remaining interchanging-required power value given by subtracting the power value indicating power interchanged in the flow [2] from the above remaining interchanging-required power value is a prescribed value, which is 1 W or more in this example (S27). The prescribed value is set arbitrarily. When the remaining interchanging-required power value is less than 1 W (S27: N), the process flow comes to an end (S30).

When the remaining interchanging-required power value is equal to or larger than 1 W (S27: Y), the power interchanging monitoring program 303 decreases a CPU frequency, interchanges power from power indicated as an interchangeable power value in the flow [3] power interchanging management table (S28), and updates a value in the interchangeable power value field 456 and a value in the currently interchanged power value field 457. When an interchangeable power value is larger than a interchanging-required power value, only the power indicated as the interchanging-required power value is interchanged. In the flow [3] power interchanging flag field 417 of the PG state management table 401, the power interchanging monitoring program 303 sets a flag for the corresponding parity group, to ON (S29).

The power interchanging monitoring program 303 selects a CPU with a value in the interchangeable power value field 456 being larger than 0, from the flow [3] power interchanging management table 405, and lowers the frequency of the CPU. The CPU is selected in arbitrary order. For example, the CPU having the smallest MP operation rate may be selected or any given CPU that meets the above requirement may be randomly selected. Power interchanged from each CPU may be the entire interchangeable power or part of the interchangeable power. When the total interchangeable power value of the CPU is smaller than the remaining interchanging-required power value, the entire power indicated as the interchangeable power value is interchanged. When the total interchangeable power value of the CPU is larger than the remaining interchanging-required power value, power indicated as the remaining interchanging-required power value is interchanged.

As described above, surplus power from a different resource is interchanged with a storage drive. As a result, a drop in the I/O performance resulting from an additional internal process can be suppressed as power consumption by the storage system is suppressed. In the above example, for selection of the power interchanging source, the flow [1] (drive box) is given the highest priority while the flow [3] (processor) is given the lowest priority. In this manner, selecting the power interchanging source according to the priority allows more proper power consumption control over the whole storage system.

Figure 10A:
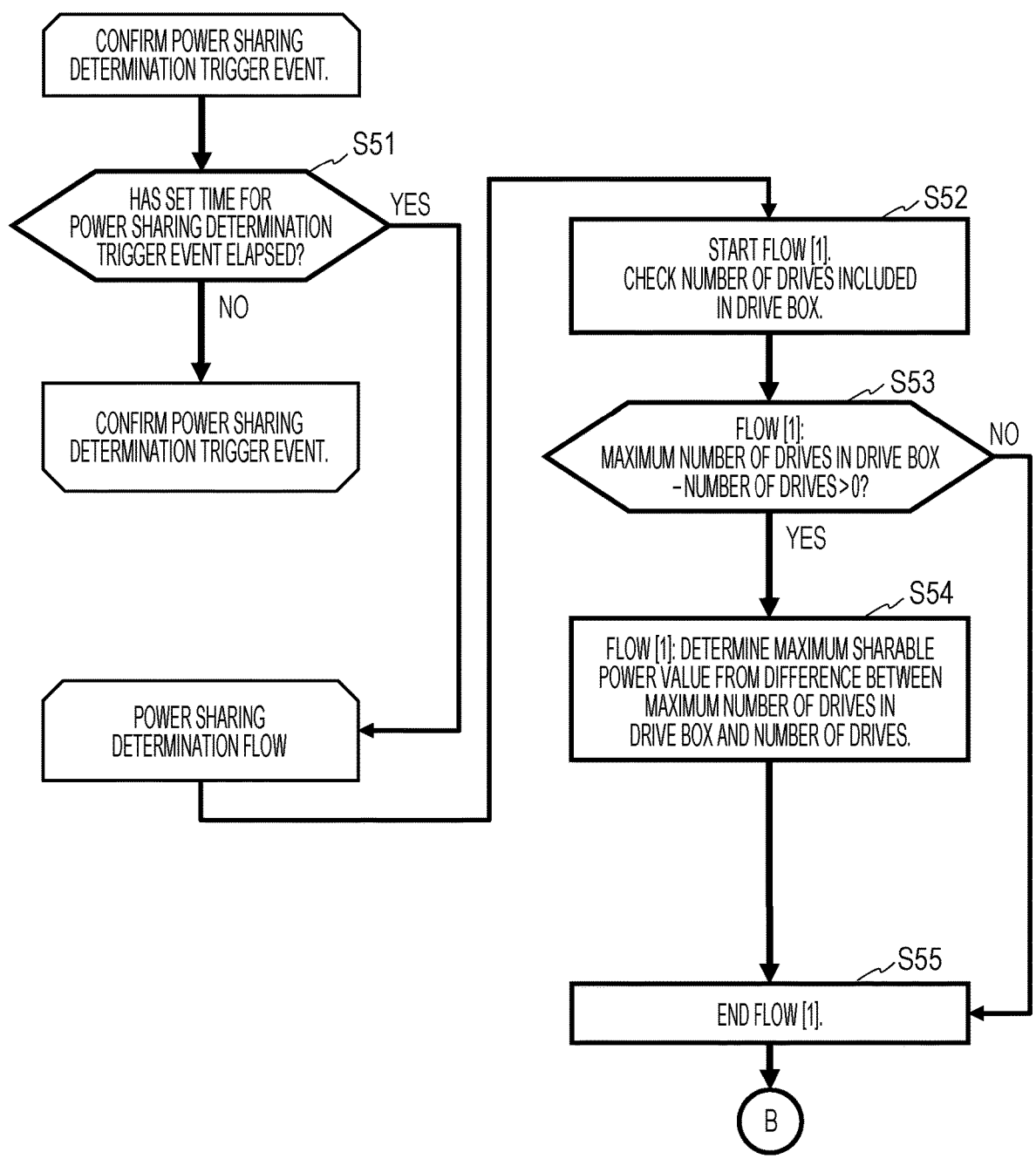
FIG. 10A depicts a flow of power interchanging determination.
Figure 10B:
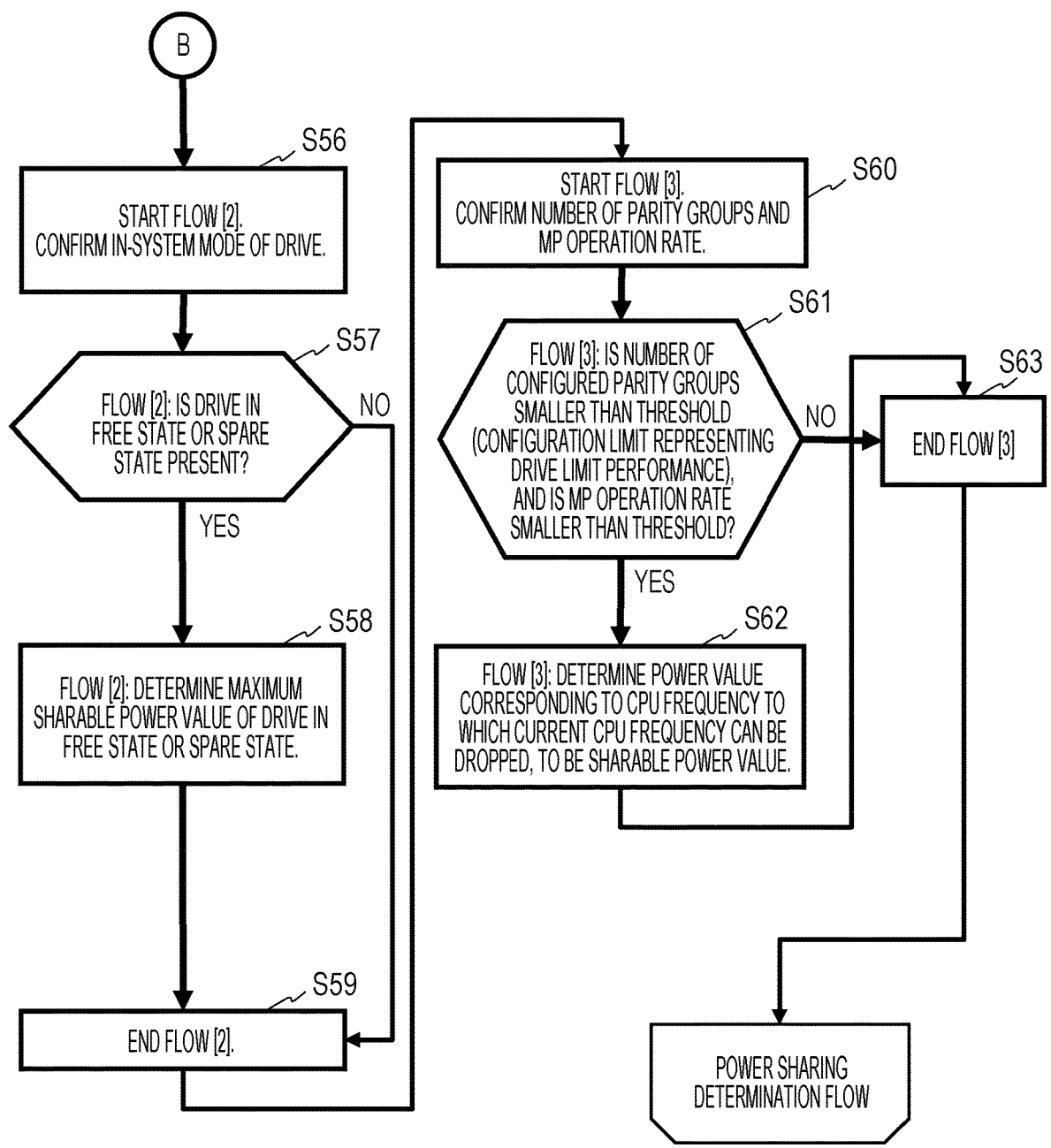
FIG. 10B depicts a flow of power interchanging determination.

Power interchanging determination processes in the flows [1], [2], and [3] will then be described. These processes update (or create) the flow [1] power interchanging management table 403, the flow [2] power interchanging management table 404, and the flow [3] power interchanging management table 405. This allows interchangeable surplus power to be pooled. FIGS. 10A and 10B are flowcharts of power interchanging determination.

In FIG. 10A, the power interchanging monitoring program 303 repeats confirmation of a power interchanging determination trigger event. Specifically, the power interchanging monitoring program 303 determines whether a set time for a power interchanging determination trigger event has elapsed from the point of previous processing (S51). This step is repeated until the set time has elapsed. In this manner, this step may be executed periodically or a different event may be defined as the trigger event.

When the set time has elapsed (S51: Y), the power interchanging monitoring program 303 executes a power interchanging determination process. The power determination/interchanging process will hereinafter be described in detail. The power interchanging monitoring program 303 executes the flow [1], flow [2], and flow [3] in increasing order.

The power interchanging monitoring program 303 first starts a process for the flow [1], that is, a process for determining interchangeable power of a drive box. A process executed on each drive box will hereinafter be described. Referring to management information (not illustrated), the power interchanging monitoring program 303 checks the number of drives included in the drive box and the maximum number of drives of the drive box (S52). Based on this information, a value in the number-of-in-system-drives field 432 is updated.

Subsequently, the power interchanging monitoring program 303 subtracts the number of drives included in the drive box from the maximum number of drives of the drive box, and determines whether a value resulting from the subtraction is larger than 0 (S53). When the resulting value is 0 (S53: N), that is, when the maximum number of drives of the drive box matches the number of drives actually included in the drive box, the drive box has no surplus power to interchange.

When the resulting value is larger than 0, that is, when the number of drives actually included in the drive box is smaller than the maximum number of drives of the drive box, the power interchanging monitoring program 303 calculates a maximum interchangeable power value, based on a difference between the number of drives actually included in the drive box and the maximum number of drives of the drive box and on a preset function (S54). The power interchanging monitoring program 303 updates an entry in the flow [1] power interchanging management table 403, using the calculated value. Specifically, a value in the interchangeable power value field 433 is updated such that the sum of the value in the interchangeable power value field 433 and a value in the currently interchanged power value field 434 matches the calculated maximum interchangeable power value.

When steps S52 to S54 are executed on all drive boxes, the process for the flow [1] comes to an end (S55).

Subsequently, the process flow proceeds to step S56 via a connection node B. FIG. 10B shows step S56 and other steps to follow. The power interchanging monitoring program 303 starts a process for the flow [2], that is, a process for determining interchangeable power of a storage drive. Referring to management information (not illustrated), the power interchanging monitoring program 303 confirms an in-system mode of each storage drive (S56). The power interchanging monitoring program 303 updates a value in the in-system mode field 445 of the flow [2] power interchanging management table 404, using the confirmed information on the in-system mode.

Subsequently, referring to the acquired information on the in-system mode, the power interchanging monitoring program 303 selects a storage drive in the FREE state or SPARE state. When the storage drive in the FREE state or SPARE state is not present (S57: N), the process for the flow [2] comes to an end (S59).

When the storage drive in the FREE state or SPARE state is present (S57: Y), the power interchanging monitoring program 303 determines a maximum interchangeable power value of the selected storage drive in the FREE state or SPARE state (S58). For example, operation power (current power consumption) of the storage drive in the FREE state or SPARE state before power interchanging is determined to be the same as the maximum interchangeable power value. The maximum interchangeable power value, however, may be smaller than the current power consumption. Using the calculated value, the power interchanging monitoring program 303 updates an entry in the flow [2] power interchanging management table 404. Specifically, a value in the interchangeable power value field 443 is updated such that the sum of the value in the interchangeable power value field 443 and a value in the currently interchanged power value field 444 matches the calculated maximum interchangeable power value.

Subsequently, the power interchanging monitoring program 303 starts a process for the flow [3], that is, a process for determining interchangeable power of a CPU. Referring to management information (not illustrated), the power interchanging monitoring program 303 acquires the number of parity groups accessed by each CPU and an MP operation rate of each CPU (S60). Based on the acquired information, the power interchanging monitoring program 303 updates a value in the MP operation rate field 452 and a value in the number-of-PGs field 454 of the flow [3] power interchanging management table 405.

Subsequently, using the acquired information, the power interchanging monitoring program 303 selects a CPU that meets requirements of the number of parity groups accessed by the CPU being smaller than a preset threshold and an MP operation rate of the CPU being smaller than a preset threshold (S61). When a CPU that meets these requirements is not present (S61: N), the process for the flow [3] comes to an end (S63).

When a CPU that meets the requirements related to the number of parity groups accessed by the CPU and the MP operation rate of the CPU is present (S61: Y), the power interchanging monitoring program 303 determines a power value corresponding to a CPU frequency to which the current CPU frequency can be dropped, to be a maximum interchangeable power value of each selected CPU (S62).

For example, a lowest CPU frequency that can be set is calculated in accordance with a difference between the current MP operation rate and the above threshold and with the current CPU frequency. The relationship between the lowest CPU frequency that can be set and the difference and current CPU frequency is determined in advance. In addition, a relationship between the CPU frequency and CPU power consumption is determined in advance as well. A difference between power consumption at the highest CPU frequency and power consumption at the calculated lowest CPU frequency that can be set is equivalent to the maximum interchangeable power value. The power interchanging monitoring program 303 updates an entry in the flow [3] power interchanging management table 405, using the calculated value. The calculated interchangeable power value is set in the interchangeable power value field 456.

Figure 11A:
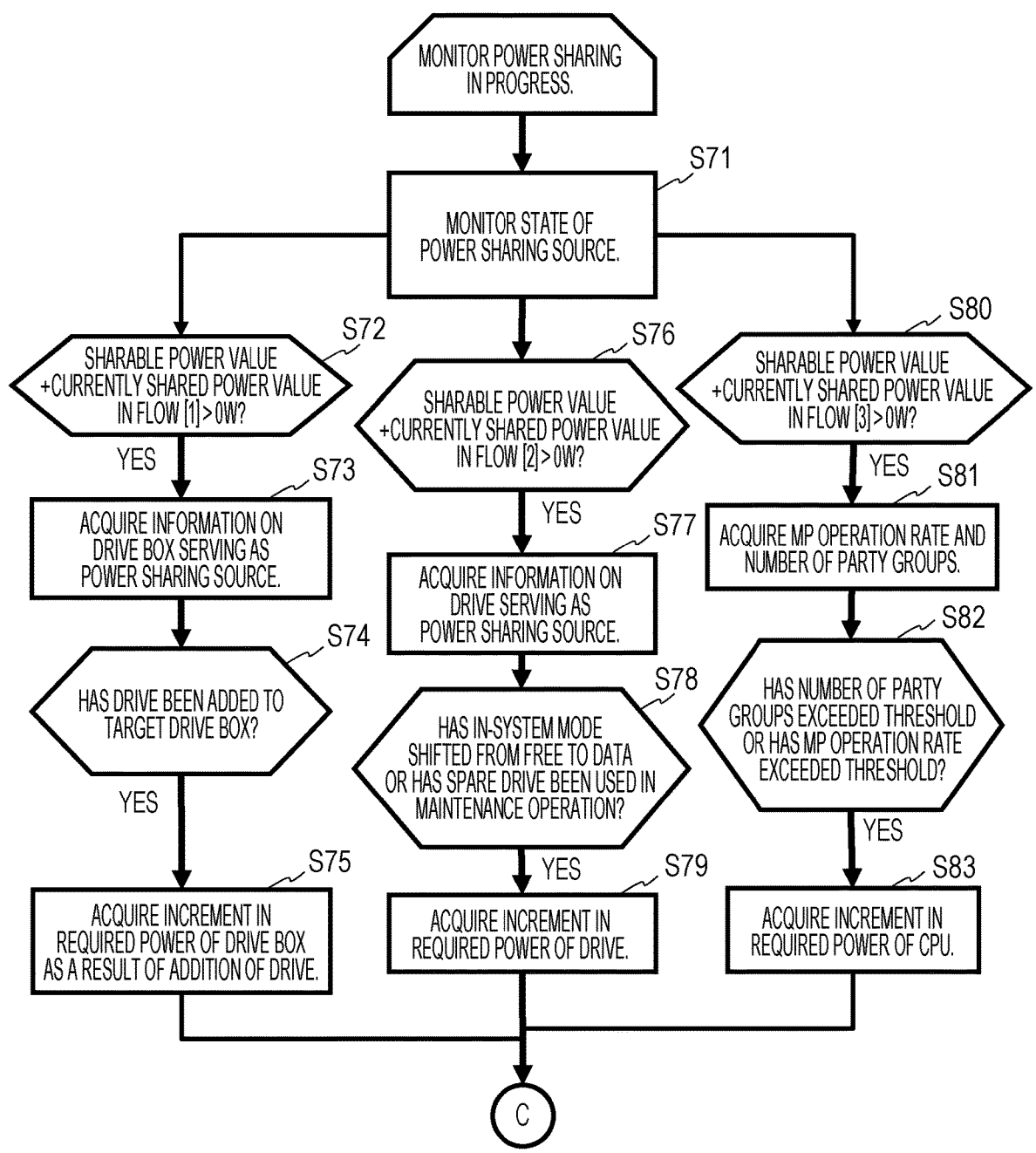
FIG. 11A is a flowchart of power interchanging-in-progress monitoring.
Figure 11B:
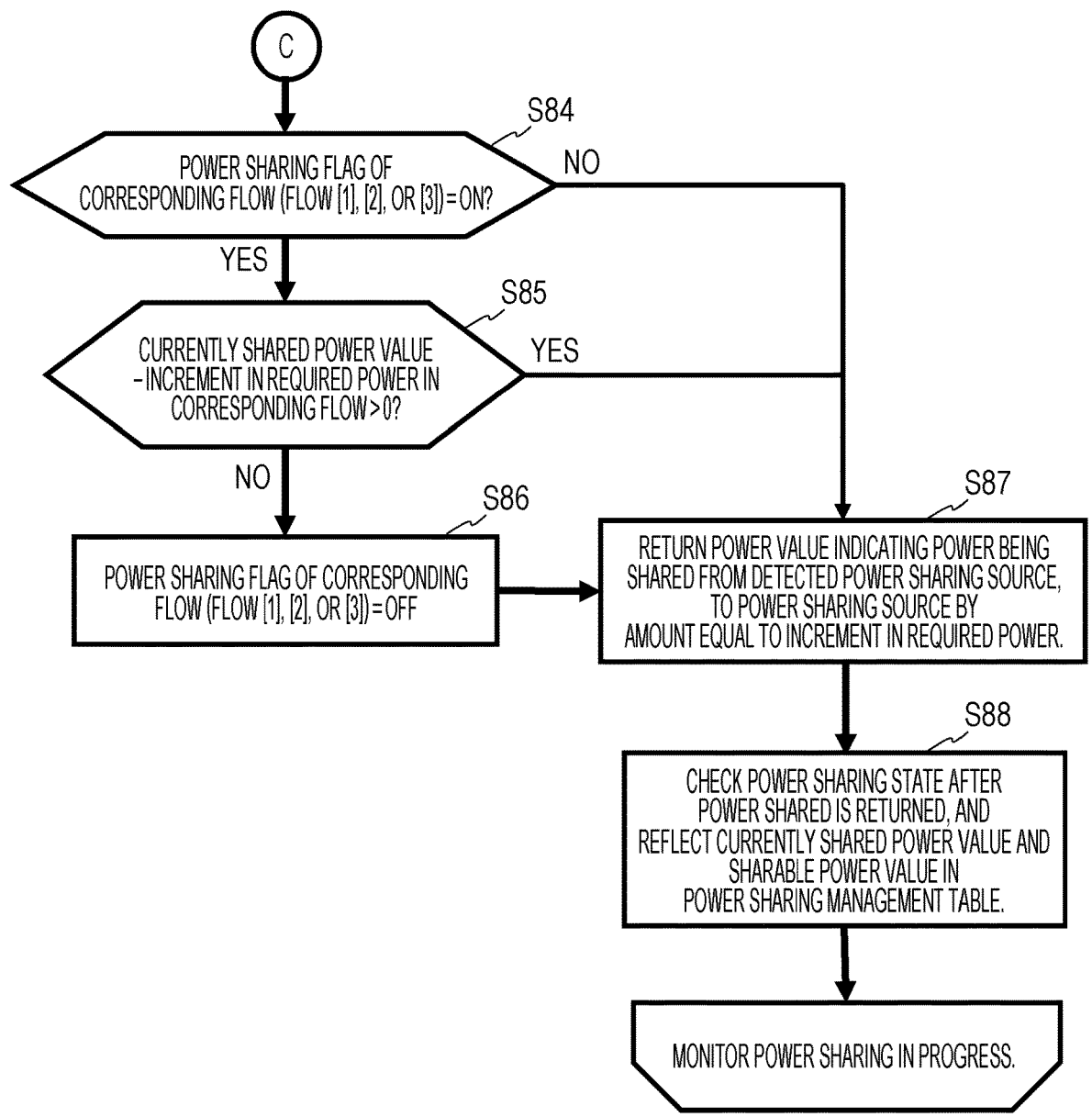
FIG. 11B is a flowchart of power interchanging-in-progress monitoring.

A power interchanging-in-progress monitoring process will then be described. Power required by a resource that interchanges surplus power with a parity group increases when a specific event occurs. By stopping power interchanging from the resource, power available to the resource is increased. FIGS. 11A and 11B are flowcharts of power interchanging-in-progress monitoring.

In FIG. 11A, the power interchanging monitoring program 303 monitors the state of a power interchanging source (resource) (S71), and makes a determination on respective resources of the flows [1] to [3]. The power interchanging monitoring program 303 starts a process on the flow [1]. Referring to the flow [1] power interchanging management table 403, the power interchanging monitoring program 303 selects a drive box with the sum of an interchangeable power value and a currently interchanged power value being larger than 0 (S72), and executes the following process on each selected drive box.

Referring to management information (not illustrated), the power interchanging monitoring program 303 acquires information on the drive box selected as a power interchanging source (S73). Specifically, the power interchanging monitoring program 303 acquires information on the number of in-system drives currently included in the drive box. The power interchanging monitoring program 303 compares the number of in-system drives indicated in the field 432 of the flow [1] power interchanging management table 403 with the actual number of drives currently included in the drive box, and determines whether a storage drive is added to the drive box (S74). When no in-system drive is added, the process on the drive box comes to an end.

When an in-system drive is added (S74: Y), the power interchanging monitoring program 303 calculates an increment in required power of the drive box as a result of addition of the storage (in-system) drive and acquires the calculated increment (S75). A maximum interchangeable power value of the drive box is determined based on the number of empty slots. The power interchanging monitoring program 303 updates a value in the number-of-in-system-drives field 432 of the flow [1] power interchanging management table 403.

The power interchanging monitoring program 303 starts a process on the flow [2]. Referring to the flow [2] power interchanging management table 404, the power interchanging monitoring program 303 selects a storage drive with the sum of an interchangeable power value and a currently interchanged power value being larger than 0 (S76), and executes the following process on each selected storage drive.

Referring to management information (not illustrated), the power interchanging monitoring program 303 acquires information on the storage drive selected as a power interchanging source (S77). Specifically, the power interchanging monitoring program 303 acquires information on a current in-system mode and maintenance operation of the storage drive. Referring to a value in the in-system mode field 445 of the flow [2] power interchanging management table 404, the power interchanging monitoring program 303 determines whether the in-system mode of the storage drive has shifted from FREE to DATA or is SPARE indicating a SPARE drive used in the maintenance operation (S78).

In a case where the storage drive is in neither of the above conditions, the process on the storage drive comes to an end. In a case where the storage drive is in either of the above conditions (S78: Y), the power interchanging monitoring program 303 acquires an increment in required power of the storage drive, from management information (not illustrated) (S79). The power interchanging monitoring program 303 updates a value in the in-system mode field 445 of the flow [2] power interchanging management table 404.

Referring to the flow [3] power interchanging management table 405, the power interchanging monitoring program 303 selects a CPU with the sum of an interchangeable power value and a currently interchanged power value being larger than 0 (S80), and executes the following process on each selected CPU.

Referring to management information (not illustrated), the power interchanging monitoring program 303 acquires information on a current MP operation rate of the selected CPU and the current number of parity groups accessed by the selected CPU (S81). The power interchanging monitoring program 303 determines whether the number of parity groups accessed by the CPU exceeds a given threshold or the MP operation rate exceeds a given threshold (S82). When neither the number of parity groups accessed by the CPU nor the MP operation rate exceeds the threshold, the process on the CPU comes to an end.

When either the number of parity groups accessed by the CPU or the MP operation rate exceeds the threshold (S82: Y), the power interchanging monitoring program 303 calculates an increment in required power of the CPU and acquires the calculated increment (S83). When the number of parity groups accessed by the CPU exceeds the threshold, the power interchanging monitoring program 303 can calculate power consumption when the CPU frequency is set to a given value, e.g., a maximum value and determine a difference between the calculated power consumption and the current power consumption, to be the increment in required power.

When the MP operation rate exceeds the threshold, the power interchanging monitoring program 303 determines a CPU frequency needed to adjust the current MP operation rate to the threshold, from the current CPU frequency and the two MP operation rates, i.e., the current MP operation rate and the MP operation rate as the threshold. The power interchanging monitoring program 303 is thus able to determine a difference between power consumption at the current CPU frequency (current power consumption) and power consumption at the CPU frequency needed to adjust the current MP operation rate, to be the increment in required power.

The process flow proceeds to step S84 via a connection node C. FIG. 11B shows step S84 and other steps to follow. The power interchanging monitoring program 303 executes the following steps on each flow (the flow [1], the flow [2], or the flow [3]) detected by the monitoring.

Referring to the PG state management table 401, the power interchanging monitoring program 303 determines whether a power interchanging flag of a target flow is ON for any one of parity groups (S84). When the power interchanging flag is OFF (S84: N), the process flow proceeds to step S87.

When the power interchanging flag of the flow is ON (S84: Y), the power interchanging monitoring program 303 determines whether a value given by subtracting an increment in required power from an overall currently interchanged power value of the flow is larger than 0 (S85). When the required power is increased by a plurality of resources, the sum of power from these resources is subtracted. When a value given by the subtraction is larger than 0, the process flow proceeds to step S87. When the value given by the subtraction is 0 or less, the power interchanging monitoring program 303 sets all flags in the power interchanging flag field of the flow in the PG state management table 401, to OFF (S86).

Subsequently, the power interchanging monitoring program 303 returns a power value indicating power being interchanged from a detected power interchanging resource, to the power interchanging resource by an amount equal to the increment in required power (S87). In another example, the power interchanging monitoring program 303 may determine the power value to return, based on an interchangeable power value of the power interchanging resource and on the increment in required power. The power value to return may be a value equal to or smaller than the interchanged power value and larger than the increment in required power. For example, a power value given by subtracting the interchangeable power value from the increment in required power is returned. In this manner, part or all of power being interchanged may be returned. Further, the power interchanging monitoring program 303 checks a power interchanging state of the power interchanging resource after part or all of power interchanged is returned, and updates the power interchanging management table 403, 404, or 405 that is the power interchanging management table of the target flow (S88).

It should be noted that the present invention is not limited to the above embodiment but includes various modifications. For example, the above embodiment has been described in detail for easy understanding of the present invention, and is not necessarily limited to an embodiment including all constituent elements described herein. Some constituent elements of a certain embodiment may be replaced with constituent elements of another embodiment, and a constituent element of another embodiment may be added to a constituent element of a certain embodiment. In addition, some constituent elements of each embodiment may be added to, deleted from, or replaced with constituent elements of anther embodiment, and such addition, deletion, and replacement may be implemented separately or in a combined form.

Some or all of the above constituent elements, functions, processing units, processing means, and the like may be provided as hardware, such as properly designed integrated circuits. In addition, the above constituent elements, functions, and the like may be provided as software-based programs by causing a processor to interpret and execute programs for implementing the constituent elements and functions. Information for implementing functions, such as programs, tables, and files, may be stored in a storage device, such as a memory, a hard disk, and a solid state drive (SSD), or in a recording medium, such as an IC card, an SD card (registered trademark), and a DVD (registered trade mark).

A group of control lines/information lines considered to be necessary for description are illustrated, and all control lines/information lines making up the product are not necessarily illustrated. It is safe to assume that, actually, almost the entire constituent elements are interconnected.

What is claimed is:

1. A storage system comprising:
   a controller; and
   a plurality of storage drives,
   wherein the storage drives make up one or more parity groups,
   wherein the controller monitors occurrence of one or more given events of an internal process different from an input/output (I/O) process on host data, the one or more given events increasing a load of a first parity group, and
   wherein in response to occurrence of the one or more given events, the controller determines a power value indicating power to be interchanged to the first parity group, from one or more types of resources different from the first parity group in the storage system,
   wherein the one or more types of resources include a plurality of types of resources, and wherein the controller selects a power interchanging source for the first parity group, from the types of resources in accordance with preset priority.

2. The storage system according to claim 1, wherein monitoring occurrence of the one or more given events is monitoring a maintenance operation in the first parity group.

3. The storage system according to claim 1, wherein monitoring occurrence of the one or more given events is monitoring at least either a formatting process in the first parity group or I/O performance of the first parity group.

4. The storage system according to claim 1, wherein one or more types of resources different from the first parity group include at least either a spare storage drive and a resource different from a storage drive.

5. A storage system comprising:
   a controller; and
   a plurality of storage drives,
   wherein the storage drives make up one or more parity groups,
   wherein the controller monitors occurrence of one or more given events of an internal process different from an I/O process on host data, the one or more given events increasing a load of a first parity group, and
   wherein in response to occurrence of the one or more given events, the controller determines a power value indicating power to be interchanged to the first parity group, from one or more types of resources different from the first parity group in the storage system,
   wherein in response to an increase in required power at a power interchanging source for the first parity group, the controller returns at least part of power being interchanged with the first parity group, to the power interchanging source.

6. The storage system according to claim 1, wherein the one or more types of resources include at least either a drive box or a processor.

7. The storage system according to claim 6, wherein a maximum interchangeable power value indicating maximum power is determined based on an operating frequency of the processor.

8. The storage system according to claim 6, wherein a maximum interchangeable power value of the drive box is determined based on a difference between a maximum number of drives of the drive box and a number of drives currently included in the drive box.

9. A control method for a storage system comprising a controller, the control method causing the controller to:
   monitor occurrence of one or more given events of an internal process different from an input/output (I/O) process on host data, the one or more given events increasing a load of a first parity group including a plurality of storage drives; and
   in response to occurrence of the one or more given events, determine a power value indicating power to be interchanged to the first parity group, from one or more types of resources different from the first parity group in the storage system,
   wherein the one or more types of resources include a plurality of types of resources, and wherein the controller selects a power interchanging source for the first parity group, from the types of resources in accordance with preset priority.

* * * * *